July 5, 1966              J. R. MOOREHEAD              3,258,913

METHOD AND APPARATUS FOR VARYING THE AREA OF AN AIR FLOW DEVICE

Filed Sept. 20, 1963                          6 Sheets-Sheet 1

INVENTOR.
JAMES R. MOOREHEAD

BY Erwin F. Adams

AGENT

INVENTOR.
JAMES R. MOOREHEAD
BY Erwin F. Adams
AGENT

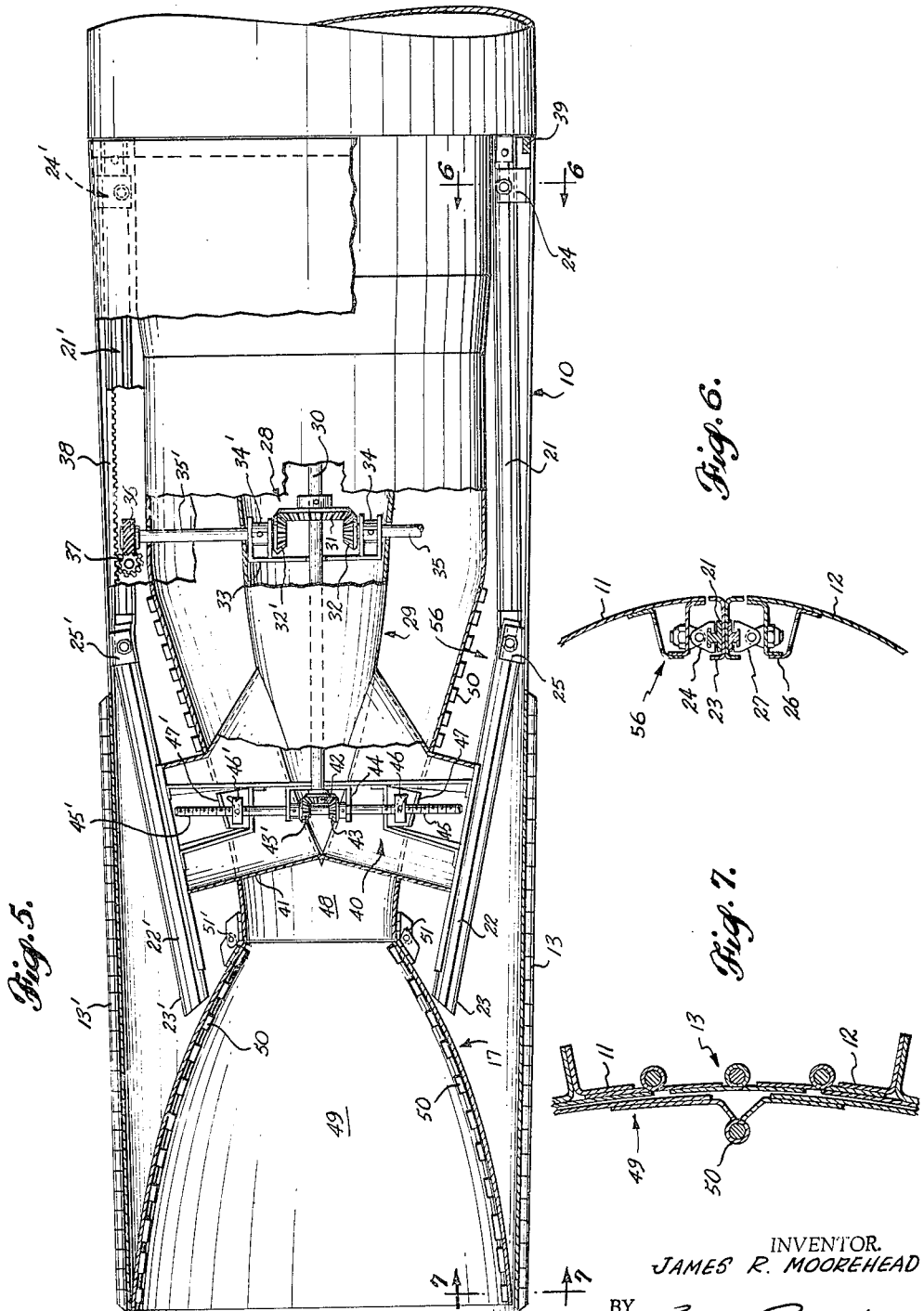

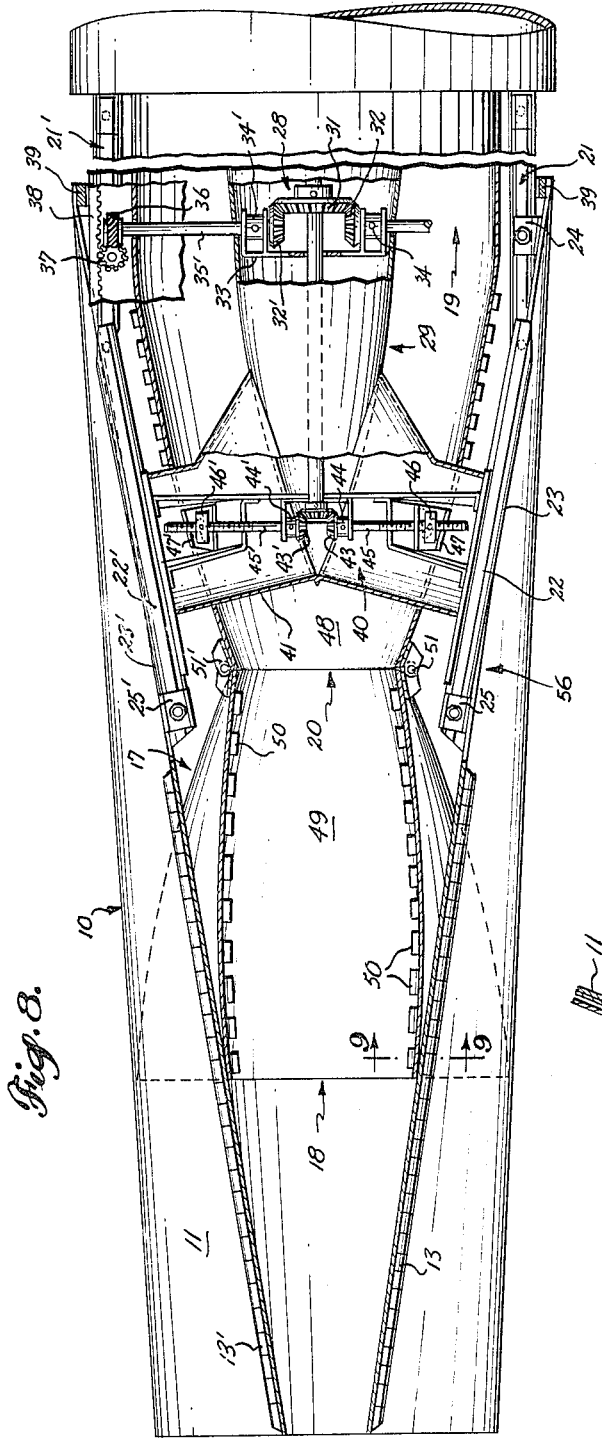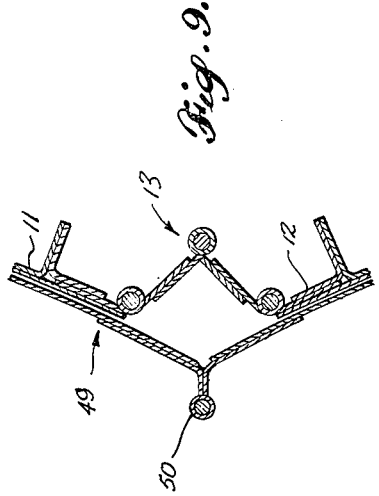

July 5, 1966   J. R. MOOREHEAD   3,258,913
METHOD AND APPARATUS FOR VARYING THE AREA OF AN AIR FLOW DEVICE
Filed Sept. 20, 1963

INVENTOR.
JAMES R. MOOREHEAD
BY Erwin F. Adams
AGENT

July 5, 1966 J. R. MOOREHEAD 3,258,913
METHOD AND APPARATUS FOR VARYING THE AREA OF AN AIR FLOW DEVICE
Filed Sept. 20, 1963 6 Sheets-Sheet 6

INVENTOR.
JAMES R. MOOREHEAD
BY Erwin F. Adams
AGENT

United States Patent Office 3,258,913
Patented July 5, 1966

3,258,913
METHOD AND APPARATUS FOR VARYING THE AREA OF AN AIR FLOW DEVICE
James R. Moorehead, Bellevue, Wash., assignor to The Boeing Company, Seattle, Wash., a corporation of Delaware
Filed Sept. 20, 1963, Ser. No. 310,283
13 Claims. (Cl. 60—35.6)

This invention pertains to a method and at least one mechanism for varying the area of an air flow device which may be used as an inlet or tailpipe on aircraft jet engines.

More particularly, the disclosed invention comprises a method for varying the cross-sectional area of an air flow device and at least one mechanism including deformable metal sections slideably connected to a jet engine and hingedly joined so that the open area may be reduced in size by deforming means during translation.

In the design of jet engines and especially engines to be used in supersonic operation it has become well known that area variation of an air flow device used either as a tailpipe or air inlet will promote efficiency. It is to be understood that "air flow device" is used herein to refer to either an air inlet or tailpipe and that "air inlet" and "tailpipe" are used to refer to the entire asembly used in combination with an air-consuming jet engine for intake or exhaust of air. The assembly comprises a nozzle which is also referred to herein as a diffuser or an exhaust nozzle, in combination with a tubular duct or cowl, the latter being moveable relative to the nozzle and jet engine. Furthermore, "nozzle" is used herein to refer to a converging, a diverging, or a converging-diverging nozzle, the latter being specifically referred to as such when so intended. The air inlet capture area variation is necessary to change the weight rate of air flow to comply with engine air flow requirements dictated by aircraft speed, weight and operating altitude, i.e. to provide inlet-engine flow matching. The tailpipe exit area is also necessarily varied according to operating conditions of the aircraft. The trend of the prior art, especially in the field of supersonic inlets and tailpipes, has led to diverse approaches in solving the variable air flow device design problem depending on whether the device is to be used as an inlet or a tailpipe.

Supersonic air inlet capture area variation has been largely confined to methods for changing the annular area between a cowl or tubular duct and a center body located therein. This has been a natural evolution from the Ostwatitsch suggested air inlet. However, to avoid the drag penalties associated with the diversion of air around a projected spike at large flow angles, inherent in the Ostwatitsch-type of air inlet, an all internal compression inlet may be designed. To effect this design a converging-diverging diffuser may be used in conjunction with a variable capture area tubular duct to provide efficient pressure recovery by area matching, i.e. changing the contraction ratio of the converging portion of the diffuser by varying the inlet and/or throat area of this portion, as well as to match the air inlet to engine air flow requirements, i.e. flow matching. The area variation is required in order to "start" the supersonic flow in the converging portion of the diffuser, a problem well known to those skilled in the art. Flow matching refers to equivalency or matching of the engine air mass flow demand with the air mass flow supplied by the inlet at any particular instant under a particular set of entrance conditions. The all internal compression supersonic inlet, therefore, would be designed to have a variable capture area cowl or tubular operating in combination with a variable cross-sectional area converging-diverging diffuser.

Jet engine tailpipe exit area variation has been approached from various aspects and a number of constructions and mechanisms have been suggested in the prior art. While some of these configurations have operated satisfactorily, such as the positioning of an axially translatable bullet within the nozzle, the inherent disadvantage of increasing the diameter of the cowl with the concomitant increase in skin drag limits the success of this type of tailpipe. However, exterior means for deforming the tailpipe cross-sectional area, which has also been suggested in the prior art, has generally resulted in increased aerodynamic profile drag.

Accordingly, it is the object of the present invention to provide a duct which may be axially translated and simultaneously deformed so as to effect a change in cross-sectional area.

A further object of the present invention is to provide a duct which may be simply deformed to a non-circular cross-section to change the area thereof and which has a minimum weight per pound of air flow passing through the duct.

A still further object of the present invention is to provide a duct useable in combination with a nozzle, to comprise an air flow device, wherein the cross-sectional areas of both the duct and nozzle may be varied according to operating conditions.

An additional object of the present invention is to provide an air flow device which when used as an air inlet for a jet engine provides all internal compression through the use of a variable capture area which is accomplished by forward translation of a duct and reshaping the cross-sectional area of the duct during translation.

A further additional object of the present invention is to provide an air flow device which when used as an air inlet for a jet engine will accept only that air required for conversion to thrust by the engine wtihout diverting or spilling excess air at high flow angles.

A still further additional object of the present invention is to provide an air flow device which when used as an air inlet and while reshaped so as to produce a reduced capture area the exterior surface of the duct is oblique to the airstream direction at a minimum angle with commensurate minimal aerodynamic drag.

Briefly, the disclosed invention comprises an air flow device, which may be used as an inlet or a tailpipe and comprises a duct and a nozzle. The duct may include a plurality of deformable metal sheets or sections which are joined along the longitudinal edges to each other through the use of hinges. The device is mounted at the forward or rearward end of a jet engine, depending on its desired use, and in part serving as the outer covering of the engine when the device is in a retracted position. Within the duct a nozzle, such as a converging-diverging or De Laval nozzle, is mounted to the engine and serves as a diffuser or an exhaust nozzle. To decrease the "opening," i.e. the exit area of the duct when used as a tailpipe or the capture area when used as an inlet, the duct may be axially translated away from the engine and the outer end of the duct deformed. During translation, stationary means are provided for reshaping the duct outer end cross-section from the retracted substantially circular cross-section, to a non-circular cross-section of less area. If two deformable metal sections are used, the cross-section may be reduced by one-half, while maintaining a constant perimeter, and assume a substantially figure-of-8 cross-sectional configuration. The cross-section area of a figure-of-8 "opening" wherein both circles are of one-half of the diameter, will yield a reduction in area of one-half.

The means to reshape the duct may be any static configuration which forces the opposing walls of the duct together as the duct translates with reference to the jet engine and the reshaping means. A rigid circular stabilizing ring is mounted on the duct at the end nearest the engine.

Since this end of the duct does not deform, the duct will assume a shape during and after translation wherein the cross-section at the forward end will progressively change from the substantially figure-of-8 cross-section at the opening to a circular cross-section at the engine end of the duct. The cross-sectional area will therefore progressively increase rearwardly. The simplest configuration for reshaping the duct during translation, is a pair of tracks which converge toward the opening or outer end of the duct. Slides mounted on the duct mediate to the hinges which join the deformable metal sections slideably engage the tracks and force the portions of the duct attached to the slides together. Since the least resistance to deformation will appear at the hinges, these will fold causing the duct to assume a multi-lobed cross-sectional area, when several deformable metal sections are used, or a substantially figure-of-8 area when only two metal sections are used.

One method of translation of the duct is provided by a shaft, driven by the jet engine and having gear means mounted thereon, which engages gear racks mounted on the inner surface of the duct through radial shafts which connect the gear means to the gear rack.

Another method for simultaneous translation and deformation of the duct is to use hydraulic actuators to translate the duct and to pivotally mount several links on a conical spike, which may be attached at the compressor or turbine outer face and extend into the nozzle. The opposite ends of the links attached to the inner surface of the duct sections such that when the duct translates the links will force the opposite duct sections toward one another causing the duct to fold at the hinges.

The drawings diagrammatically illustrate by way of example, not by way of limitation, one form of the invention which comprises several novel features hereinafter set forth wherein like reference numerals designate corresponding parts in the several views in which:

FIG. 5 is a longitudinal section view of an air flow device, having a duct with two deformable metal sections and a converging-diverging nozzle located in the duct, in the retracted position;

FIG. 6 is a detailed sectional view of a track and slide on the line 6—6 in FIGURE 5;

FIG. 7 is a detailed sectional view of a hinge on the line 7—7 in FIGURE 5;

FIG. 8 illustrates the device of FIG. 5 in the extended position;

FIG. 9 is a detailed sectional view of a hinge, shown in FIGURE 7, in a folded position, taken on line 9—9 in FIGURE 8;

Figure 10:
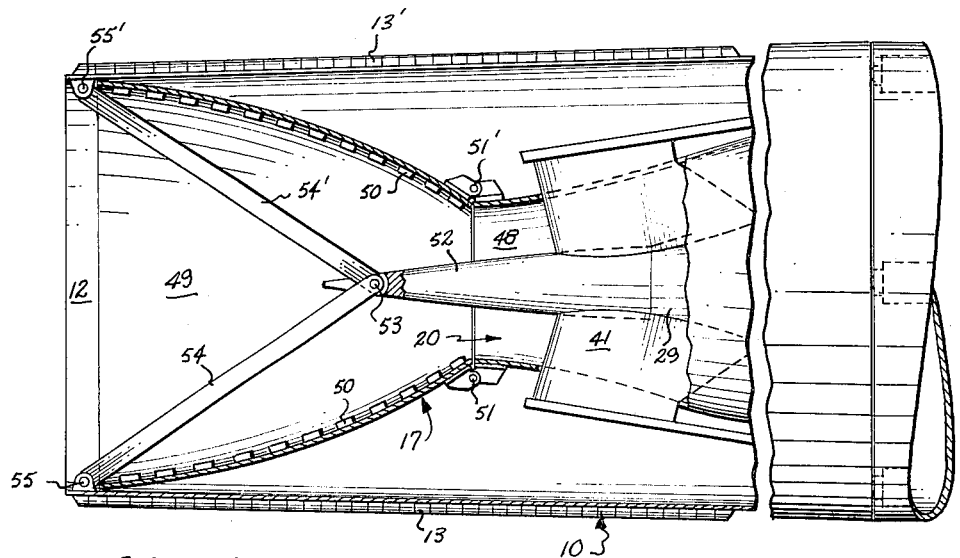
Figure 11:
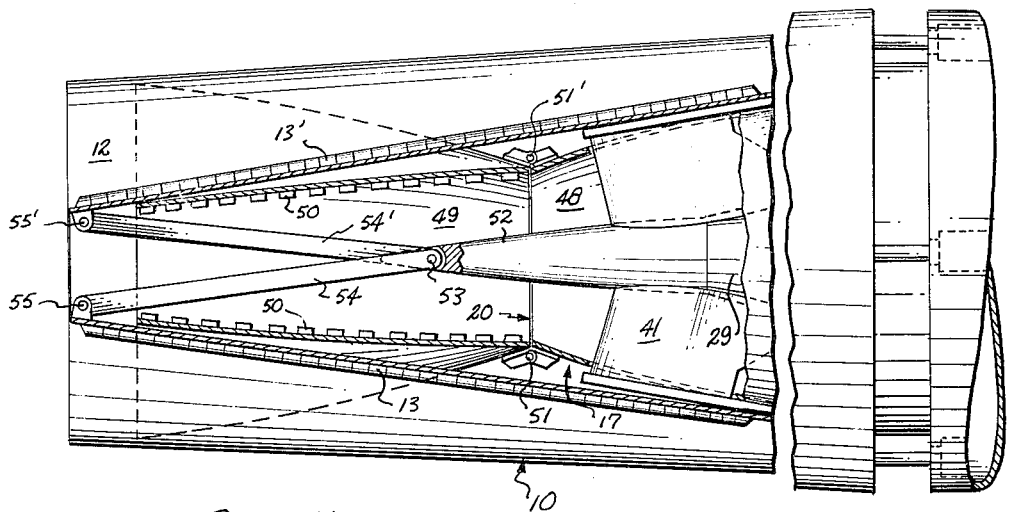
Figure 12:
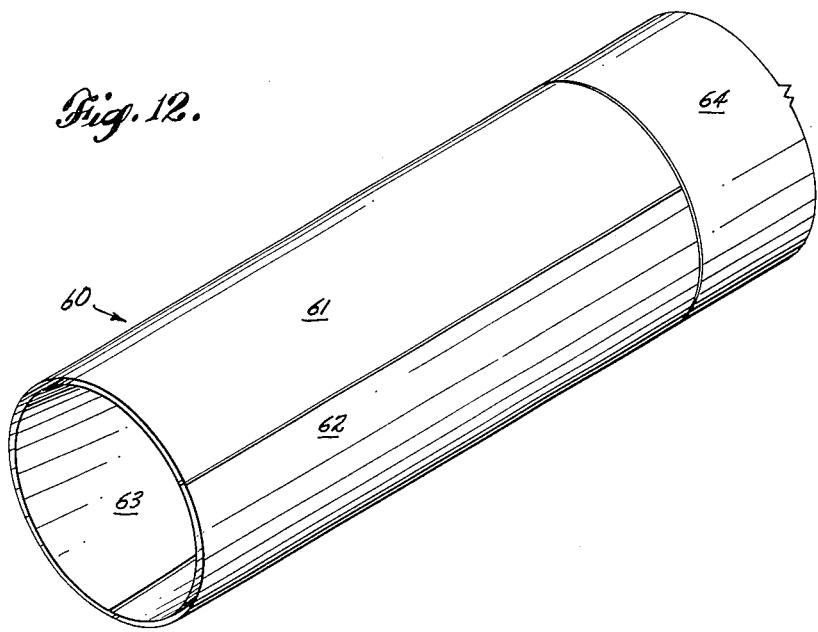
Figure 13:
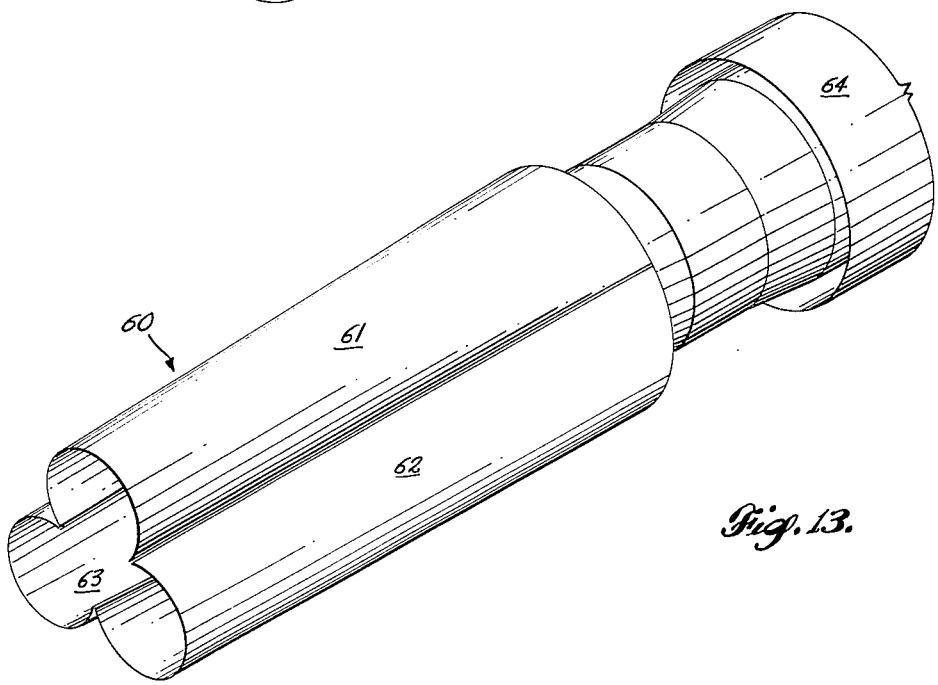

FIG. 10, a modification of FIG. 5, is a cross-sectional view of an air flow device, having a duct with two deformable metal sections, in the retracted position, and a modified means for deforming the duct;

FIG. 11 shows the device of FIG. 10, in the extended position;

FIG. 12 is a perspective view of an air flow device, having a duct with a plurality of deformable sections, in the retracted position; and FIG. 13 illustrates the device of FIG. 12, in the extended position.

The present invention relates to a new method and mechanism for performing the method of deforming or reshaping the cross-sectional area of a duct to a non-circular cross-section and a diffuser or nozzle, as shown in FIGS. 1 through 4. While the mechanism and its operation will be described hereinafter, reference is first made to the significance of the configuration of the duct and diffuser in the extended and retracted positions. Also, while the following description will be restricted to a duct having only two sections, it will be pointed out later that the duct may be composed of a plurality of sections which results in a different configuration. Furthermore, for simplicity in description, the duct will be exemplified as a supersonic air inlet for a jet aircraft engine.

Figure 1:
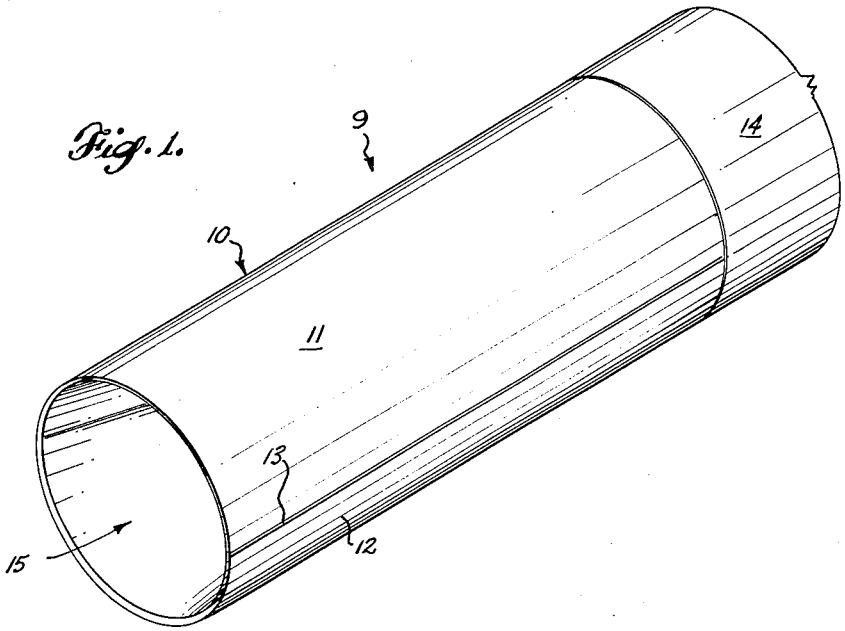
FIG. 1 is a perspective view of an air flow device, having a duct with two deformable metal sections, in the retracted position.
Figure 2:
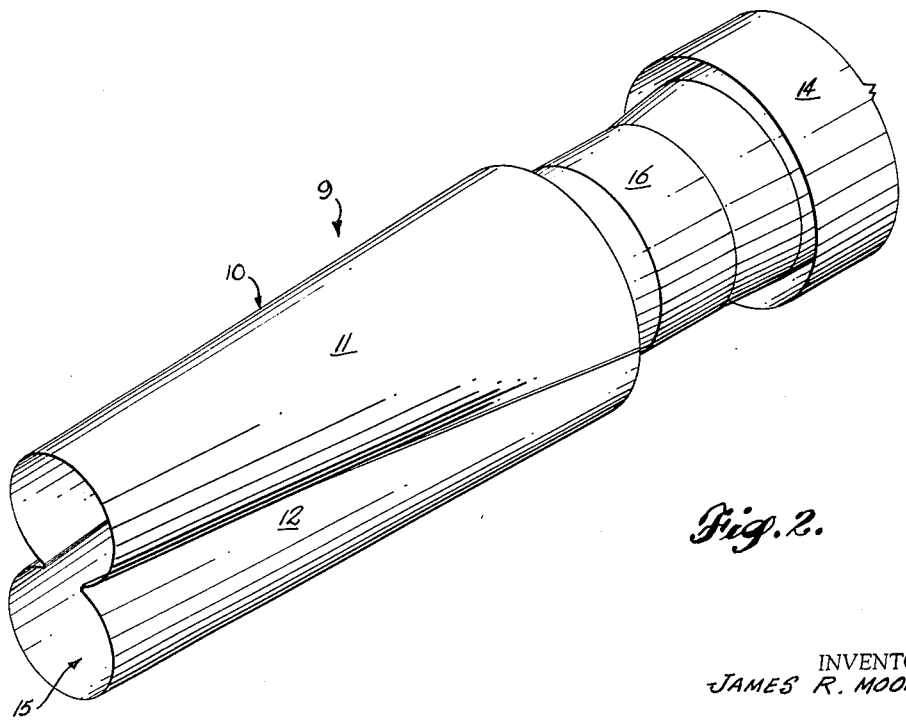
FIG. 2 illustrates the device of FIG. 1 in the extended position.

Referring to FIG. 1, an air flow device 9 is shown having a duct 10 which is comprised of two deformable metal, or suitable material, sections 11 and 12. The sections 11 and 12 which comprise the duct 10 are semi-cylindrical in shape when the duct is in the retracted position as shown in FIG. 1. The longitudinal edges of the sections are joined by hinge means 13 and form a tubular duct which abuts rear engine cowling 14. The opening or capture area 15 through which the air enters is substantially circular and provides the maximum area obtainable. It will be appreciated therefore that maximum air flow results with the duct in this position and would correspond to use of the duct as an aircraft inlet during take-off and at supersonic speeds. To restrict or reduce the opening area 15, as would be desired for aircraft speeds of near Mach 1.0 the duct 10 is translated forward and the forward or outer end is deformed so as to result in a configuration, of non-circular cross-section of reduced area, shown in FIG. 2. The translation of the duct accomplishes the necessary capture area change, while satisfying aerodynamic considerations, i.e. while providing both minimal profile drag and skin drag. A short non-translated duct mounted forward of the jet engine, if deformed so as to produce a significantly reduced area, would result in duct walls which are appreciably canted with respect to the airstream so as to produce a high profile drag. On the other hand, a non-translated duct of substantial length so as to present small profile drag when deformed, would present an inlet of high total length resulting in increased skin drag. Both profile and skin drag may be minimized by positioning the aft portion of a long duct, such as duct 10, over a substantial portion of the jet engine 16 when in the retracted position so as to form an effectively short duct length. However, when the inlet is translated forward and the engine 16 is exposed as shown in FIG. 2, the duct may be deformed without a resulting high drag angle between the duct section walls and the airstream.

Figure 3:
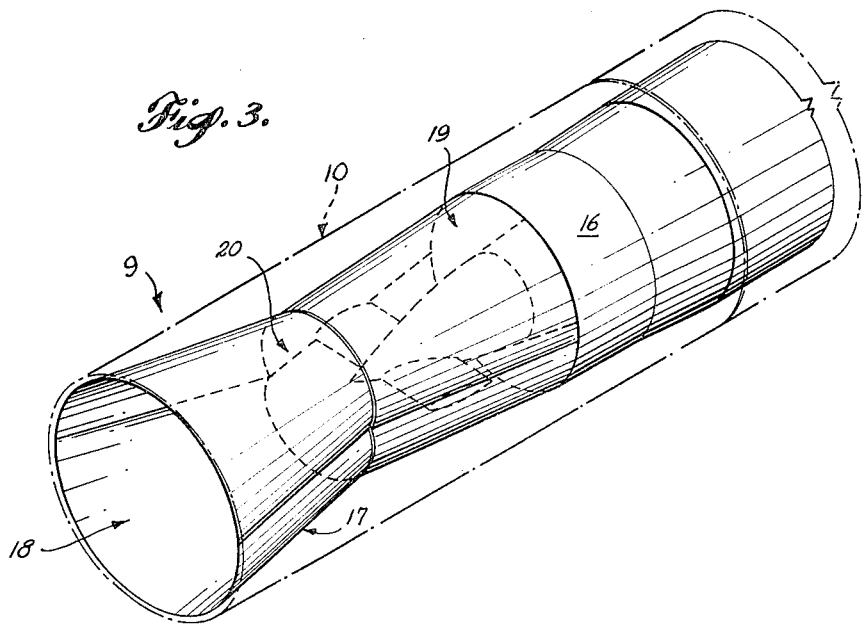
FIG. 3 is a perspective view of an air flow device having a duct with two deformable metal sections, and showing a converging-diverging nozzle, in the retracted position.
Figure 4:
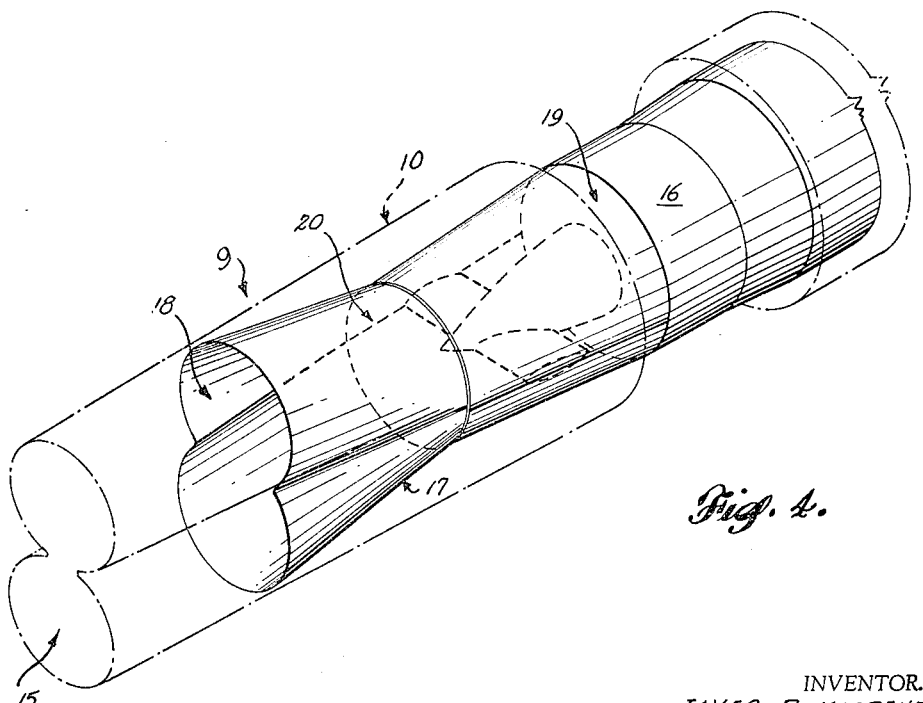
FIG. 4 illustrates the device of FIG. 3 in the extended position.

Since the air flow device may be designed to be used as an all internal compression inlet, normal supersonic aircraft utilization may involve the use of a converging-diverging diffuser 17, as shown in FIG. 3, one end of which is mounted on the end of a jet engine 16 and concentrically positioned within the duct 10. The cross-sectional area of the diffuser 17, when the duct 10, shown in broken lines, is in the retracted position, will be substantially circular at the forward opening 18 and the aft opening 19 and of substantially figure-of-8 shape at the throat portion 20. In the extended position, as in FIG. 4, the end not attached to the jet engine having opening 18 is changed to a substantially figure-of-8 cross-section, and the throat portion 20 assumes a near circular cross-section, while the aft opening 19 remains circular. The changes in the cross-sectional area of the diffuser 17 may be directly related to the cross-sectional area changes in the duct 10 through mechanism described later. However, these correlated area changes are to be recognized as having functional import. The air flow device must handle air under changing conditions of relative speeds, pressures, temperatures and densities to match the engine air requirements which likewise are changeable as the propulsive thrust demands are varied. At low subsonic speeds, the air mass flow as well as the throat area of the diffuser must be large. At transonic speeds, the air mass flow required is considerably less, but the throat area must remain large. And at supersonic speeds, the weight rate of air flow must be high again, but the throat area must be reduced. The variation of these two parameters may be correlated through the present invention to provide an air flow device which yields area matching for efficient partial isentropic diffusion and flow matching for engine requirements. While the duct, of course, could be used to provide flow matching without the deformable converging-diverging diffuser, which provides the area matching, the combination of the two is particularly advantageous.

Mechanism for deforming the outer end of the duct while the duct is being translated forward is shown in FIG. 5 where the duct is in the retracted position, and again in FIG. 8 where the duct is extended. The deforming means comprises two pairs of rearward and forward tracks 21, 21', and 22, 22' which are mounted on beams 23 and 23' respectively, as shown best in FIG. 5. The beams 23 and 23' are mounted on diametrically opposite sides of converging-diverging diffuser 17 and within duct 10 and extend forward of the engine section 16 (not shown in FIGURE 5 and FIGURE 8) adjacent to converging-diverging diffuser 17. The rearward tracks 21 and 21' are mounted on the rearward parallel portions of beams 23 and 23', while the tracks 22 and 22' are mounted on the forward portion of the beams 23, 23' and converge toward the duct outer end. Two pairs of slides 24, 24' and 25, 25' slideably engage the pairs of tracks 21, 21' and 22, 22' respectively. The slides may be fixedly mounted to bracket 26, as shown in FIG. 6 through a hinge joint 27. The slide 24 while rotatable about an axis parallel with the track 21, is restrained from axial movement with respect to the bracket 26 and therefore with respect to the deformable section 11 and 12. As shown in FIG. 6, the tracks and associated slides are mounted on both the top and bottom of the beams 23, 23'.

The duct 10, in FIG. 5, is axially moveable by translation means comprising gear means 28 which is located within a conical spike 29 mounted forward of jet engine section 16. A shaft 30 driven by the engine 16 extends forward of the gas turbine compressor (not shown) and into conical spike 29. Axially mounted on shaft 30 is a ring gear 31 which engages two pinion gears 32 and 32' which comprise the gear means 28. A bracket 33 is fixedly mounted within the conical spike 29 having journals 34 and 34' to support radial shafts 35 and 35' on the inner ends of which are mounted the pinion gears 32 and 32'. At the outer end of each of the radial shafts a helical gear, such as 36 on shaft 35, is mounted, which engages a gear means having a helical gear mounted with a spur gear, shown together by 37, the two being rotatably mounted to duct 10 and both having their axis at right angle to the axis of gear 36. Fixedly mounted to the metal section and engaging the spur gear of the gear means 37 is a gear rack 38. Transmission of power to shaft 30 to drive the duct 10 may be controlled by any suitable clutch mechanism (not shown). While only two pinion gears, radial shafts, and one of the gear means and gear racks are shown and described, it will be appreciated that any number of pinions, shafts, gear means and gear racks may be utilized for translation of the duct 10. Furthermore, although the gear drive system has been described in considerable detail as the preferred embodiment of the duct translation means, any suitable system employing electrical, mechanical or hydraulic power could be used to effect the translation.

Hinge means 13, 13' provided to connect the longitudinal edge of deformable metal sections 11 and 12, as previously described, are shown in more detail in FIGS. 7 and 9. FIG. 7 shows a triple hinge 13 in the unfolded position as when the duct 10 is retracted and FIG. 9 shows the hinge folded as when the duct 10 is extended and the sections 11 and 12 form two frusto-conical surfaces which intersect along the longitudinal axes and gives rise to the approximate figure-of-8 cross-section, FIGS. 2 or 4. While ordinary single hinges would suffice to interconnect the sections 11 and 12, the triple-hinges 13, 13', represent a preferred embodiment which facilitates folding without any binding or jamming.

To translate the duct 10 from the retracted position to the extended position, FIG. 8, the gear means 28 is engaged which drives the radial shafts 35 which in turn drives the gear rack 38 forward through spur gear 36 and gear means 37. As the duct moves forward, the slides 24, 24' and 25, 25' move along the tracks 21, 21' and 22, 22', respectively. Since the slides follow the tracks, the forward slides 25, 25', converge toward the opening 15 and the portion of the metal sections 11 and 12 immediately adjacent to the slides tend to converge, and the hinges 13, 13' connecting the metal sections will fold. The hinges 13, 13' continue to converge and the duct 10 in its fully extended position shows the forward ends of the two hinges 13, 13' drawn together so as to nearly meet. It will be appreciated that the area of the duct 10 in the extended position is of a substantially figure-of-8 cross-section as best seen in FIG. 2. The near figure-of-8 cross-section at the duct outer end opening progressively rearwardly approaches a full circle since a rigid circular stabilizing ring 39, attached to the aft inner surface of sections 11 and 12, does not deform during the duct translation. The reverse of the above steps will obviously return the duct to its retracted position.

The duct 10 may be used with a converging-diverging diffuser 17 as an all internal compression inlet as in FIG. 5. Means to deform the diffuser 17 cross-section so as to change the area is shown generally by 40. A pair of hollow radial struts 41 are provided at the forward portion of conical spike 29 and attach at the outer ends to beams 23 and 23'. The shaft 30 which selectively drives the translation means 28 extends forward into the struts 41 in which are located a ring gear 42 and two pinion gears 43 and 43' mounted in a journaled bracket 44. Attached to each of the two pinion gears are threaded shafts 45, 45' and nuts 46, 46' mounted on the shafts. The nuts 46, 46' are located within box-like brackets 47, 47' which are fixedly attached to the diverging portion 48 of diffuser 17.

The forward portion 49 of diffuser 17 which converges in the direction of air flow as well as the rearward portion 48 which diverges in the direction of air flow are each comprised of two deformable metal segments. A plurality of short hinges 50 attach the longitudinal edges of the segments together. The forward portion 49 of the diffuser is attached to the rearward portion 48 through hinge means 51 and 51' which are adapted to fold as the segments of the two portions change in angular relationship to each other.

In operation, the converging-diverging diffuser 17 changes in shape as the duct 10 is deformed. The forward or converging portion 49 of the diffuser will be reshaped along the hinge means 50 by the force of the translating deforming means or duct on the rearwardly converging segments, as seen in FIG. 8. When the duct is in the retracted position, the converging portion is of circular cross-section at the forward end, as previously pointed out, and of substantial figure-of-8 cross-section at the throat 20. The translation of the duct and the concomitant deforming of it, however, forces the converging portion to assume a figure-of-8 cross-section at the forward end. The throat 20 cross-sectional area will assume the circular cross-section, due to the deforming means 40. The cross-section of the diverging portion of the diffuser is changed through the diffuser deformation means 40. As the duct begins to translate and the shaft 30 is engaged through the clutch mechanism, the ring gear 42, through the pinion gears 43, 43' rotates the threaded shafts 45, 45' so as to force the nuts 46, 46' against the outer portion of brackets 47, 47', thus forcing the diverging segments in an outward direction. The diverging portion 48 is in a substantially figure-of-8 cross-section when the duct is retracted, but as the duct translates and the diffuser deforming means 40 is engaged the cross-section of this portion, as well as the throat 20, is changed to circular, as may be seen in FIG. 8.

An alternate arrangement for the means to deform the duct 10 is shown in FIG. 10 where the duct is in the retracted position and in FIG. 11 in the extended position. The conical spike 29 has been lengthened with a spike extension 52 so as to pass through the throat area 20 and into the forward portion 49 of the diffuser 17. Mounted on a pivot pin 53 at the tip of the extension are two links 54 and 54′ which are attached at their outer ends to a pair of pivot pins 55 and 55′, the latter being fixedly mounted to the forward edge of the duct 10. The duct pivots 55 and 55′ are mounted immediately adjacent to the hinge means 13, 13′ of the duct, respectively, so that forward translation of the duct to the extended position of FIG. 11 causes the links 54, 54′ to swing about the pivot pin 53 and thus draw together the portions of the duct sections 11 and 12 adjacent to the outer link pivot pins and along the hinges 13 and 13′. The converging forward portion 49 of the diffuser 17 will be deformed by the force of the converging duct walls upon the diverging portion segments. The diverging rearward portion 48 of the diffuser 17, as in the previous embodiment, will be deformed by the nozzle deforming means to assume a substantially figure-of-8 cross-section as there described. It should be noted that the forward translation required to deform the duct is much less compared with the slide-track means 56. This would allow for a much simpler method to be used to translate the duct, such as a hydraulic cylinder rather than the gear and rack system. The distance which the duct is required to travel may be varied by shifting the position of the pivot pins 55 and 55′ on the duct and varying the length of the links commensurately. Moreover, consideration must be given to diffuser flow conditions in determining the most desirable initial position of the links.

While the above description has been limited to a duct in which only two deformable metal sections were used, it may be seen in FIG. 12 where a duct 60 is shown in a retracted position that a plurality of sections 61, 62, and 63 may comprise the duct. The duct in its extended position appears in FIG. 13. The cross-sectional configuration of the duct in the extended position will depend on the number of sections constituting the duct. The area reduction of the opening is of course a function of the configuration and while the substantially figure-of-8 cross-section that results when two sections are used will produce a reduction of approximately one-half the original area, an increased number of sections will produce a smaller reduction for the same amount of translation. Deforming means for the duct may consist of a number of tracks and pairs of slides, similar to the previously described duct 10 but equal to the number of sections used in the configuration. In the alternative embodiment of duct 10 shown in FIGURES 12 and 13 where the link means described with respect to FIGURES 10 and 11 perform the deformation, the number of links may also be equal to the number of sections. Translation means, however, may remain independent of the number of sections comprising the duct. A converging-diverging diffuser may also be used in combination with the multiple lobe cross-section duct configuration shown in FIGS. 12 and 13. Since the converging portion of the diffuser, as explained in reference to the air flow device 9 is formed by the forcing of the diffuser segments by the pressure exerted by the duct 10, the converging portion must necessarily comprise a number of segments equal to the number of sections in the duct. The diverging portion of the diffuser may also be made of a number of segments equal to the number of duct sections so as to form a multiple lobe cross-section when the duct is retracted. However, the diffuser configuration may be independent of the number of duct sections used, the only criteria for the configuration being that the area reduction be properly matched to the area reduction of the opening of the duct. While FIGS. 12 and 13 show a triple-lobed configuration, it will be appreciated that any number of lobes may be made by varying the number of deformable duct metal sections, without departing from the scope of the invention.

As explained at the outset, the previous description was directed to the use of the air flow device as an air inlet for a supersonic aircraft engine installation. It may be readily appreciated that an air flow device 9 may also be designed for a subsonic engine installation by simply varying the type of diffuser 17 used with the duct 10.

It is also to be understood that while the air flow device was described for its use as an air inlet, it may also be used as a tailpipe. When used as a tailpipe the direction of air flow through the device will of course be reversed, i.e. exhaust gas will exit from the opening 15 in duct 10. Furthermore, use of the device as a tailpipe will employ a duct, such as 10 or 60; but the nozzle mounted within the duct will generally be of the rearwardly converging type, at least in a turbojet application. Utilization of the device as a tailpipe for a ramjet, however, would employ a converging-diverging nozzle and would be substantially of the same configuration as shown in FIGS. 1 through 13.

While there has been shown and described the fundamental novel features of this invention as applied to the preferred embodiment, it will be understood that various omissions and substitutions and changes in the form and details of the device illustrated and in its operation may be made by those skilled in the art without departing from the spirit of the invention. It is the intention therefore to be limited only by the scope of the following claims and reasonable equivalents thereof.

I claim:
1. A deformable diffuser comprising:
  (a) a forward portion converging in the direction of air flow having a plurality of deformable metal segments joined along their longitudinal edges by a plurality of hinges,
  (b) an aft portion diverging in the direction of air flow having a plurality of metal segments joined along their longitudinal edges by a plurality of hinges and mounted at an aft end to a jet engine,
  (c) nozzle hinge means interconnecting the aft end of said forward converging portion and the fore end of said aft diverging portion,
  (d) tracks fixedly mounted to the jet engine and converging toward said forward portion,
  (e) translating deforming means engaging said tracks for reshaping said forward portion to a cross-section of reduced area,
  (f) means for deforming said aft portion, and
  (g) driving means operably connected to said translating deforming means and said means for deforming said aft portion.

2. The diffuser recited in claim 1 wherein said means for deforming the aft portion comprises:
  (a) gear means operably connected to said driving means,
  (b) a plurality of shafts engaging said gear means and having outer ends threadably engaging said aft portion segments whereby operation of said gear means rotates said shafts thereby forcing said segments in one direction.

3. A method for forming an air flow device including a tubular movable and deformable duct, one end of the duct being slideably mounted on a jet engine and a deformable nozzle internally of the duct and having one end of the nozzle mounted to the jet engine comprising the steps:
- (a) translating the duct in a fore and aft direction relative to the jet engine,
- (b) simultaneously deforming the other end of the duct to a non-circular cross-section of reduced area,
- (c) maintaining the duct perimeter constant throughout translation thereof, and
- (d) simultaneously deforming the cross-sectional area of the nozzle with translational movement of the duct.

4. An air flow device comprising:
- (a) a tubular duct comprising a plurality of longitudinally extending deformable metal sections, said duct having an outer end, and an inner end adapted to slideably connect to a jet engine,
- (b) a plurality of duct hinge means interconnecting the longitudinal edges of said sections,
- (c) a deformable metal nozzle positioned within said tubular duct, and one end of said nozzle being connected to the jet engine,
- (d) driving means for translation of said tubular duct in a direction, axial of said duct,
- (e) means for deforming the outer end of said tubular duct during translation to form a cross-section of reduced area, and
- (f) means operably connected to said driving means for deforming said nozzle cross-section in direct relation to the deformation of said tubular duct.

5. The combination recited in claim 4 wherein the means for deforming the outer end of said tubular duct comprises:
- (a) a plurality of tracks fixedly mounted to the jet engine and extending within said duct, said tracks converging toward said outer end, and
- (b) a plurality of slides fixedly mounted to said deformable metal sections, said slides engaging said tracks, whereby translation of said duct in one direction forces said duct outer end to deform to a non-circular cross-section of reduced area.

6. The air flow device recited in claim 4 wherein the deformable metal nozzle comprises:
- (a) a plurality of deformable metal segments, each segment having one end attached to the jet engine, and
- (b) a plurality of hinges interconnecting the longitudinal edges of said segments.

7. The air flow device recited in claim 6 wherein the means for deforming said nozzle comprises:
- (a) gear means operably connected to said driving means,
- (b) a plurality of shafts engaging said gear means and having outer ends threadably engaging said nozzle segments whereby operation of said gear means, while the duct translates in one direction, rotates said shaft thereby forcing the segments in one direction.

8. An air flow device comprising:
- (a) a tubular duct comprising a plurality of longitudinally extending deformable metal sections, said duct having an outer end, and an inner end adapted to slideably connect to a jet engine,
- (b) a plurality of duct hinge means interconnecting the longitudinal edges of said sections,
- (c) a deformable metal nozzle positioned within said tubular duct and one end of said nozzle being connected to the jet engine,
- (d) driving means for translation of said tubular duct in a direction, axial of said duct,
- (e) means for deforming the outer end of said tubular duct during translation to form a cross-section of reduced area comprising
  - (1) a substantially conical spike adapted to be mounted on the jet engine within said tubular duct, and
  - (2) a plurality of links, one end of each such link being pivotally attached to the spike and the other end of each such link being pivotally attached to said duct immediately adjacent to said duct hinge means whereby translation of said duct in one direction forces said duct outer end to deform to a cross-section of reduced area; and
- (f) means operably connected to said driving means for deforming said nozzle cross-section in a given relation to the deformation of said tubular duct.

9. An air flow device comprising:
- (a) a tubular duct comprising at least two deformable metal sections, said duct having an outer end, and an inner end adapted to slideably connect to a jet engine,
- (b) a pair of duct hinge means interconnecting the longitudinal edges of said sections,
- (c) a deformable metal nozzle positioned within said tubular duct and one end of said nozzle being connected to the jet engine,
- (d) driving means for translation of said tubular duct in a direction axial of said duct,
- (e) means for deforming the outer end of said tubular duct during translation to form a substantially figure of eight cross-section of reduced area, and
- (f) means operably connected to said driving means for deforming said nozzle cross-section.

10. An air inlet comprising:
- (a) a tubular duct comprising a plurality of deformable metal sections, said duct having a forward end, and an aft end adapted to slideably connect to a jet engine,
- (b) a plurality of duct hinge means interconnecting the longitudinal edges of said sections,
- (c) a deformable metal nozzle comprising:
  - (1) a forward portion converging in the direction of air flow and having a plurality of deformable metal segments equal in number to the metal sections in said tubular duct, said metal segments being joined along their longitudinal edges by a plurality of hinges,
  - (2) an aft portion diverging in the direction of air flow and having a plurality of metal segments joined along their longitudinal edges by a plurality of hinges, and
  - (3) nozzle hinge means interconnecting said forward converging portion and said rearward diverging portion,
- (d) driving means for translation of said tubular duct in a direction axial of said duct,
- (e) means for deforming the forward end of said tubular duct during said axial translation to form a cross-section of reduced area, and
- (f) means operably connected to said driving means for deforming said nozzle aft portion.

11. The air inlet recited in claim 10 wherein the means for deforming the forward end of said tubular duct comprises:
- (a) a plurality of tracks fixedly mounted to the jet engine and disposed within said tubular duct forward of the jet engine, said tracks converging towards the forward end of said tubular duct,
- (b) a plurality of slides fixedly mounted to said deformable metal sections, said slides engaging said tracks, whereby translation of said duct in one direction forces said duct forward end to deform to a non-circular cross-section of reduced area.

12. The air inlet recited in claim 10 wherein the means for deforming the forward end of said tubular duct comprises:
- (a) a substantially conical spike adapted to be mounted on the jet engine and to extend forward of the jet engine and within said tubular duct, and
- (b) a plurality of links, one end of each such links being pivotally attached to the spike and the other end of each such links being pivotally attached to said duct immediately adjacent to said duct hinge means whereby translation of said duct in one direction forces said duct outer end to deform to a cross-section of reduced area.

13. The air inlet recited in claim 10 wherein the means for deforming said nozzle aft portion comprises:
    (a) gear means operably connected to said driving means,
    (b) a plurality of shafts connected to said gear means and having outer ends threadably engaging said nozzle aft portion segments whereby operation of said gear means while the duct translates in one direction rotates said shafts thereby forcing the nozzle aft portion segments in one direction.

References Cited by the Examiner
UNITED STATES PATENTS

| | | | |
|---|---|---|---|
| 2,546,293 | 3/1951 | Berliner | 60—35.6 |
| 3,007,304 | 11/1961 | Wotton | 60—35.6 |
| 3,098,352 | 7/1963 | Taub | 60—35.6 |

MARK NEWMAN, *Primary Examiner.*

RALPH D. BLAKESLEE, *Examiner.*